March 5, 1935.   F. M. CARROLL   1,993,592
WEIGHING SCALE
Original Filed Oct. 22, 1927
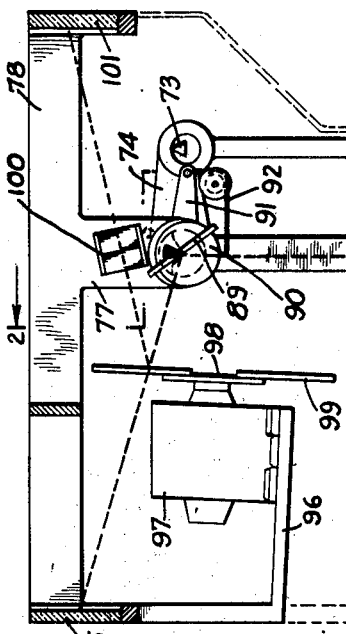
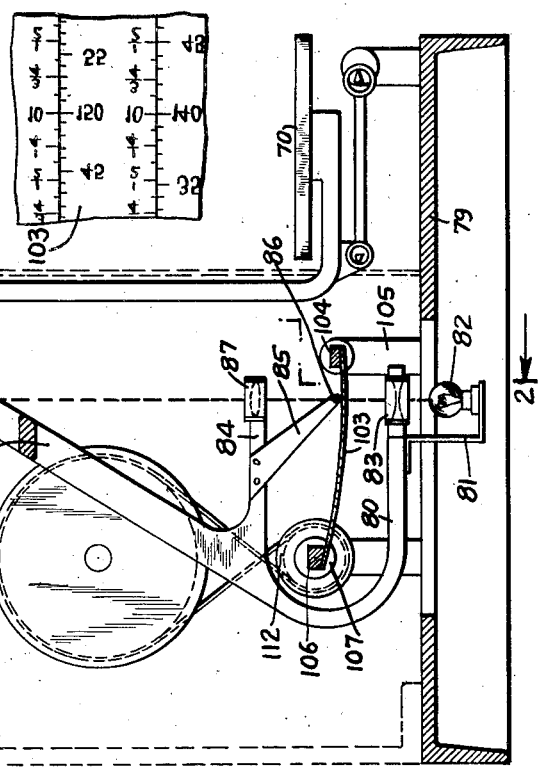

Patented Mar. 5, 1935

1,993,592

UNITED STATES PATENT OFFICE 1,993,592

WEIGHING SCALE

Fred M. Carroll, Yonkers, N. Y., assignor, by mesne assignments, to The Hobart Manufacturing Company, Troy, Ohio, a corporation of Ohio Original application October 22, 1927, Serial No. 227,987. Divided and this application May 31, 1930, Serial No. 457,698.

12 Claims. (Cl. 265—37)

This case is a division of my co-pending application Serial No. 227,987, filed October 22, 1927, (now Patent 1,856,411) and relates to weighing scales of the computing type.

It is the practice in the computing scale art to provide the scale chart with a plurality of graduated scales, each corresponding to a different rate or price per unit weight. In order to accommodate an extensive range of rates, the graduations and corresponding rate indications must be very small. Further, it is also usual to inscribe the chart with the corresponding weight indications alongside the rate indications. This results in making all the indications on the chart extremely small. It is also desirable in computing scales to show the indication on both the customer's and the merchant's side of the scale. This has previously required the use of two sets of graduations, one a duplicate of the other, making the graduations on the chart even more minute in order to accommodate the same number of scales.

An object of this invention is to display an image of a chart designation alternately on a plurality of screens.

Another object of this invention is to obtain a single image of a chart indication and direct said image in one or more directions to be displayed upon screens.

Still another object is to provide optical projecting devices connected to the load offsetting mechanism.

Still further, an object is to provide a light source connected to the load offsetting mechanism for illuminating the portion of the chart corresponding to the weight of the object on the scale.

Other objects and advantages of this invention will be apparent from the following description, in which reference is had to the accompanying drawing, illustrating the preferred embodiment of my invention and wherein similar reference numerals designate similar parts throughout the drawing wherein:

Fig. 1 is a side sectional view through the machine embodying the invention.

Fig. 2 is a section on line 2—2 of Fig. 1.

Fig. 3 is a plan detail view of a chart.

In detail the drawing shows an optical reading system including a light source movable with the pendulum and a stationary chart cooperating with a reading system and a light source. The scale comprises a platform 70 having vertical links 71 extending within the housing 72 and suspended at their upper ends from knife edges 73 fixed in the arms 74 of a pendulum 75. The pendulum is fulcrumed by means of the usual knife edges in bearings 76 formed in the ends of arms 77 of the fixed frame 78. The end of the pendulum terminates in a horizontal arm 80 on which is fixed a bracket 81 supporting a lamp 82. Mounted in the end of the arm 80 above lamp 82 is a condenser lens 83. An arm 84 integrally extending from the pendulum 75 in the same direction as arm 80 has fastened to it a plate 85 in the end of which is mounted at right angles thereto an indexing element comprising a hair line 86. The end of arm 84 has an aperture in which is mounted a reversing lens 87 in line with lens 83 and lamp 82.

A shaft 88 is fulcrumed in bearings 76 in alinement with the center of oscillation of the pendulum likewise suspended in said bearings. Attached to the shaft 88 intermediate its ends is a mirror 89 normally tipped at an angle of about 45°. Near its ends, the shaft carries discs 90 one of which has an arm 91 integrally extending therefrom at right angles. Attached to said arm near its end is one end of a wire 92 the other end of which is attached to a pin 93 fixed in the sides of one of the furcations 94 of the pendulum. The ratio of the distances of attachment of the wire to the pendulum and the arm 91 is 1 to 2. The points of attachment obviously move equal distances upon movement of the pendulum. If the pendulum oscillates through an angle, the arm 91 and the shaft 88 to which it is fixed will oscillate through half of the angle, since for the same distance of movement of the ends of two or more radii the angle subtended is proportional inversely to the length of the radii. The mirror 89 fixed on shaft 88 will therefore move through half the angular distance that the pendulum moves through. It may be readily demonstrated that if a beam cast on a mirror moves from one position to another through an angle, that the beam reflected from the mirror remains fixed in direction if the mirror be moved through half of angle. As explained above, mirror 89 moves through half the angular distance of pendulum 75. Hence a beam from lamp 82 fixed to the pendulum and moving with it will always be reflected from mirror 89 in the same direction, thus the image carried by the beam will be always in the same location on the screen 95 which is in the line of sight of the customer.

A bracket 96 rigid with the housing supports a motor 97, to the shaft of which is fixed a disc 98. The disc carries a pair of mirrors 99 separated by a wide space. During their rotation, mirrors 99 intercept a beam of light L' from the lamp 82 and reflect it through a triangular prismatic lens 100 which reverses the image horizontally and casts it upon a screen 101 viewed by the merchant.

When the space between the mirrors crosses the beam of light, the beam is not intercepted but passes to mirror 89 which reflects the image upon screen 95. Thus if the motor shaft be rapidly rotated, a series of images of a scale reading carried by beam L' will be intermittently but in rapid succession thrown alternately on both screens.

The optical system and weight offsetting mechanism so far described in this modification cooperates with a transparent chart 103 having a plurality of different rate and weight rows arranged parallel to the direction of movement of the pendulum as in the previous modification. The chart is attached at one end to a rod 104 slidably mounted in an opening of standard 105 supported on base 79. The other end of the chart is attached to a rod 106 terminating in an internally threaded sleeve portion 107 and having a portion 108 slidably supported in standard 109 supported on base 79. A threaded shaft 110 fits into sleeve 107 and cooperates therewith so that upon rotation of the shaft, the rod 106 and the chart carried by said rod moves in the direction of its length. The rate rows on the chart thus move across the optical reading system comprising lamp 82 and lenses 80 and 84. Shaft 110 is journalled in a standard 111 supported on the base 79 and is provided with a pulley 112 having a driving connection with a pulley 113 also journalled in said standard 111. Fixed to the pulley 113 is a rate indicating wheel 114 in which is marked the various rates on the scale chart. The pulley 113 is rotated by means of a hand wheel 115.

In operation, the hand wheel is rotated till the price and scale rate desired to be scanned by the beam of light from the lamp 82 is indicated on wheel 114. In accordance with the indication on said wheel 114, the rate row indicated will be positioned in a vertical plane passing through the center of lenses 83 and 87 and perpendicular to hair line 86. The motor 97 is then set in motion and the article to be weighed placed on platform 70 causing the pendulum 75 together with the lamp 82 and lenses 83 and 87 to swing along the selected rate row on the scale chart 103.

When the pendulum ceases moving the beam of light L' is focused on a reading in the selected rate row. The light beam as it passes through the chart carries with it the image of the portion of the chart selected by the load on the scale and by the rate adjustment and also the image of the indexing element 86. The mirrors 89 and 98 alternately cast these images on screens 95 and 101. The weight and price graduations and numerals cast on the screens are indexed by the image or shadow of indexing element 86 and the reading is taken by the observer at the point where the shadow of element 86 intersects the image of the graduations. The reading, with the hair line 86 serving as an index line is reflected from rotating mirrors 99 onto screen 101 and from mirror 89 upon screen 95. An image of the weight and rate reading is thus presented alternately to both the customer and merchant.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. In combination a chart having indications corresponding to weight, weighing mechanism, a load support for moving the weighing mechanism, a lamp carried by and partaking of the movement of the weighing mechanism, an indexing element for defining the point of the chart to furnish the load indication, and an optical device between the lamp and chart for converging the rays of light from the lamp onto a restricted portion of the chart to illuminate only that indicating portion of the chart coacting with and adjacent opposite sides of said indexing element.

2. In combination, a chart, weighing mechanism, a lamp movable under control of said mechanism along said chart for illuminating portions of the chart, means cooperating with an illumined portion of the chart for forming an enlarged image of said illumined portion, and a screen upon which said means casts said image of the chart.

3. In combination, an effectively transparent chart, weighing mechanism, means for projecting portions of the chart including a lamp and coacting light directing means both movable under control of said mechanism along said chart for selectively projecting a beam through the chart bearing an image of the portion of the chart corresponding to the operation of the weighing mechanism, and means for intercepting the image-bearing beam.

4. In combination, a chart having graduations corresponding to weight, a load support, load resisting mechanism operated by said support, and including an element moved according to the load, a lamp supported by said element to partake of its motion and cooperating with said chart to illuminate graduations on said chart corresponding to the load on the support, an image-displaying device, and means cooperating with said illumined graduations of the chart for projecting the illumined graduations on said image-displaying device.

5. In combination, a load support, a graduated chart for indicating the load on the support, weighing mechanism associated with said support and moved thereby according to the load, an optical element carried by said weighing mechanism for cooperation with said chart, a primary light source for generating rays of light and mounted on and carried by said weighing mechanism for illuminating said chart through said optical element, means for reflecting the illuminated portion of the chart and a screen on which said reflecting means directs said reflection.

6. In combination, an image displaying device, a load support, weighing mechanism connected to the support to be moved thereby according to the load, an effectively transparent chart, a pair of optical elements, one on each side of said chart and in alinement connected to said weighing mechanism, and a lamp cooperating with said optical elements for projecting an enlarged image of the chart on said image displaying device, said lamp being supported by and partaking of the movement of said weighing mechanism.

7. In combination a screen, weighing mechanism including a rockable element movable according to a load imposed on said weighing mechanism, a primary light source for generating rays of light and rigidly mounted on said rockable element to partake of its motion, a graduated transparent chart between the source of light and the screen, and means for projecting the portion of the chart illuminated by said source of light onto said screen.

8. In combination, a transparent chart, weighing mechanism including an element movable according to a load imposed on said weighing mechanism, a primary light source for generating rays of light and rigidly mounted on said element to partake of its motion, a lens between the light source and the chart for condensing the rays of light from said source onto a portion of the chart, a screen, and means on the side of the chart opposite the light source for projecting an image of the illuminated portion of the chart onto said screen.

9. In combination, a load support, load resisting mechanism connected thereto and including a rockable element moved according to the load, an effectively transparent indicating chart, a lamp mounted on said element to partake of its motion, means coacting with the lamp for directing rays of light from said lamp in the form of a beam through a portion of the chart corresponding to the movement of the lamp and the load resisting mechanism, and a device on the side of the chart opposite said lamp and said means for intercepting the beam after it passes through and bears an image of said portion of the chart.

10. In combination, a load support, weighing mechanism operated by the support and including a movable device movable in accordance with the load on the support, a chart, a lamp controlled by said device to move parallel to, along one side of, and in confronting relation to said chart for selectively illuminating portions of the chart, and an optical device cooperating with the illumined portion of the chart to form a magnified image thereof.

11. In combination, a load support, load resisting means connected thereto, a chart, a lamp carried by said resisting means for illuminating portions of the chart corresponding to the load on the support, and a device connected to and movable in accordance with operation of said resisting means for coacting with the lamp and chart to form a beam bearing a magnified image of the portion of the chart corresponding to the load on the support.

12. In a scale, a load support and weighing mechanism operated thereby in combination with load registering means including a screen, an indexing element connected to and movable in response to operation of the weighing mechanism, and provisions for casting a shadow of the element onto the screen to indicate the point of the screen from which the load registration is to be taken.

FRED M. CARROLL.